United States Patent [19]

Ohgoda et al.

[11] Patent Number: 4,694,163
[45] Date of Patent: Sep. 15, 1987

[54] APPARATUS FOR SCANNING SHEET-SHAPED RECORDING MEDIUM WITH A BENDING ROLLER

[75] Inventors: Makoto Ohgoda; Kaoru Tamura; Yasuhiro Kawai, all of Kanagawa, Japan

[73] Assignee: Fuji Photo Film Co., Ltd., Kanagawa, Japan

[21] Appl. No.: 657,640

[22] Filed: Oct. 4, 1984

[30] Foreign Application Priority Data

Oct. 21, 1983 [JP] Japan .................................. 58-197192

[51] Int. Cl.[4] .............................................. H01J 3/14
[52] U.S. Cl. ..................................... 250/234; 271/266
[58] Field of Search ............... 250/234, 570, 571, 562, 250/563, 572; 271/264, 266, 270, 272, 273, 274, 275; 235/475; 358/292

[56] References Cited

U.S. PATENT DOCUMENTS

| 1,828,000 | 10/1931 | Ranger | 250/571 |
| 4,054,924 | 10/1977 | Zimmerman | 250/570 |
| 4,315,318 | 2/1982 | Kato et al. | 364/414 |
| 4,387,428 | 6/1983 | Ishida | 250/337 |
| 4,493,994 | 1/1985 | Hilton | 250/562 |

Primary Examiner—David C. Nelms
Attorney, Agent, or Firm—Sughrue, Mion, Zinn, Macpeak, and Seas

[57] ABSTRACT

An apparatus for scanning a sheet-shaped recording medium comprises a first conveyance system and a second conveyance system for receiving and conveying the recording medium conveyed by the first conveyance system. The second conveyance system is spaced from the first conveyance system by a distance shorter than the length of the recording medium. A roller is positioned between the first conveyance system and the second conveyance system and moves up and down to contact and bend the recording medium after the recording medium conveyed by the first conveyance system reaches the second conveyance system. A scanning optical system is positioned on the side opposite to the roller with respect to the recording medium for scanning the bent surface of the recording medium by a light beam in a scanning direction normal to the conveyance direction of the recording medium.

6 Claims, 3 Drawing Figures

APPARATUS FOR SCANNING SHEET-SHAPED RECORDING MEDIUM WITH A BENDING ROLLER

BACKGROUND OF THE INVENTION

1. Field of the Invention

This invention relates to an apparatus for scanning a sheet-shaped recording medium by a light beam and recording an image thereon or reading out an image therefrom. This invention particularly relates to an apparatus for scanning a sheet-shaped recording medium, which is provided with an improved sub-scanning conveyance system wherein sub-scanning is conducted by moving the recording medium in one direction at a predetermined speed during two-dimensional scanning of the recording medium by a light beam.

2. Description of the Prior Art

An image scanning method for recording an image in a recording medium or for reading out an image therefrom by two-dimensionally scanning the recording medium by a light beam is widely used in facsimile devices and the like. In the method, two-dimensional scanning is conducted by deflecting a light beam by a light deflector in one direction (main scanning direction) to form a scanning line on the recording medium and by mechanically moving the recording medium in a direction (sub-scanning direction) normal to the main scanning direction, thereby forming many scanning lines in parallel with each other.

As disclosed, for example, in U.S. Pat. No. 4,258,264 and Japanese Unexamined Patent Publication No. 56(1981)-11395, the aforesaid image scanning method is also employed for reading out a radiation image stored in a stimulable phosphor sheet or for reproducing the read-out radiation image stored in a recording medium in a radiation image recording and reproducing system. In the radiation image recording and reproducing system, it is necessary to regularly conduct scanning in the main scanning direction at a predetermined period and to carry out movement of the recording medium in the sub-scanning direction at a predetermined speed. That is, when the recording medium is moved at a low speed in the sub-scanning direction and, at the same time, a light beam is deflected in the main scanning direction normal to the sub-scanning direction on the recording medium, the recording medium must be precisely moved at the predetermined speed. Otherwise, recording nonuniformity or read-out nonuniformity arises, and it becomes impossible to obtain a reproduced image accurately representing the image density. Therefore, high accuracy is required for scanning in the sub-scanning direction, necessitating high-precision expensive holding means and movement mechanism for the recording medium.

In order to move the recording medium as described above, various mechanisms have heretofore been used. In one arrangement, for example, the sheet-shaped recording medium is closely contacted with the surface of a drum by using clamping devices or pinch rolls, and the drum is rotated. In another arrangement, a suction box is positioned at a part inside of a drum, and the drum is rotated with the recording medium closely contacted with a part of the drum by suction. In still another mechanism, a suction box is positioned inside of a perforated belt, and the belt is moved with the recording medium placed thereon. In these mechanisms, since the clamping devices or the suction box is required for closely contacting the recording medium with the drum or the belt, the mechanism becomes complicated and the apparatus becomes large and expensive.

Further, in the case where a suction box is used, there arise various problems in practical use such as the noise and vibration of a blower for suction, the fluctuation of the suction pressure, and the like. Particularly in a scanning apparatus for image recording or read-out wherein the recording medium must be moved precisely and a precise scanning optical system is incorporated, vibration and fluctuation of the suction pressure cause the movement speed of the recording medium to fluctuate and adversely affect the recording or read-out operation.

In an image read-out scanning apparatus for scanning a recording medium carrying an image stored therein by a light beam and for detecting light carrying the image obtained thereby, a light guide member is generally positioned near the recording medium. In this case, in order to improve the light guiding efficiency, it is generally desired that the light guide member be positioned as close to the recording medium as possible. However, when the conventional clamping devices or pinch rolls are used, it is not always possible to position the light guide member close to the recording medium because of the presence of mechanisms protruding in the vicinity of the clamping devices or the pinch rolls.

SUMMARY OF THE INVENTION

The primary object of the present invention is to provide an apparatus for scanning a sheet-shaped recording medium, which is comparatively small and has a simple configuration.

Another object of the present invention is to provide an apparatus for scanning a sheet-shaped recording medium, which securely holds a recording medium and realizes precise optical scanning.

The present invention provides an apparatus for scanning a sheet-shaped recording medium, the apparatus comprising:

(i) a first conveyance means for conveying the sheet-shaped recording medium, (ii) a second conveyance means for receiving and conveying said recording medium conveyed by said first conveyance means, said second conveyance means being positioned downstream of said first conveyance means in spaced relation thereto by a predetermined distance shorter than the length of said recording medium, (iii) a roller positioned between said first conveyance means and said second conveyance means which moves in a direction approximately normal to a recording medium conveyance plane for contacting said recording medium after said recording medium conveyed by said first conveyance means reaches said second conveyance means, thereby bending said recording medium convex as viewed from the side thereof opposite to said roller, and (iv) a scanning optical system positioned on the side opposite to said roller with respect to said recording medium for scanning the convex surface of said recording medium bent by said roller by a light beam in a scanning direction normal to the conveyance direction of said recording medium.

In the apparatus for scanning a sheet-shaped recording medium in accordance with the present invention, when a recording medium is scanned by a light beam for reading out or recording an image, the roller positioned between the first conveyance means and the second conveyance means is contacted with the recording medium so that the recording medium is conveyed in the predetermined form bent by the roller. Therefore, it is possible to convey the recording medium consistently and precisely in close contact with the roller in the sub-scanning direction and to accurately record or read out an image.

Further, in the apparatus for scanning a sheet-shaped recording medium in accordance with the present invention, since no clamping devices or suction box is used, the configuration of the apparatus becomes simple, and the apparatus becomes small, inexpensive and easy to maintain. Also, the problems of noise and vibration are eliminated.

When the scanning apparatus of the present invention is used for image read-out, since there are no mechanisms such as clamp devices or pinch rolls protruding near the surface of the recording medium on which image read-out is conducted, it becomes possible to position a light source and a light guide member close to the recording medium as in the case where a suction box is used. In other words, the scanning apparatus of the present invention has the advantage that it is free from noise and vibration as in the case where clamping devices or pinch rolls are used and also the advantage that the scanning read-out system can be positioned close to the recording medium as in the case where a suction box is used. Further, the configuration of the scanning apparatus in accordance with the present invention is simpler than those of the conventional apparatus using the clamping devices or the pinch rolls and the conventional apparatus using the suction box.

In the present invention, when the recording medium is merely conveyed at a high speed without scanning it by a light beam, it is possible to widen the space between the recording medium and the light source or the light guide member by returning the roller for contacting and bending the recording medium to a predetermined position where the recording medium is not bent by the roller. Therefore, the recording medium can be conveyed at a high speed without contacting the light source or the light guide member even when the recording medium flutters or is curled.

The sheet-shaped recording medium may be any photosensitive material in which an image can be optically recorded by scanning with a light beam or any image storage medium which carries an image stored therein and which releases light carrying the image when scanned by a light beam. The photosensitive material may, for example, be printing paper or a photographic film. The image storage medium may, for example, be paper or a film sheet carrying an image stored therein, or a stimulable phosphor sheet carrying a radiation image stored therein as disclosed, for example, in U.S. Pat. Nos. 4,236,078 and 4,239,968.

The image storage medium releasing the light carrying the stored image when scanned by a light beam may be of the type releasing light having the same wavelength as that of the light beam, i.e. of the type reflecting the light beam, or may be of the type emitting light having a wavelength different from that of the light beam.

As the first conveyance means in the apparatus of the present invention, it is possible to use any known conveyance means such as a belt or a roller.

As the second conveyance means, it is possible to use any means for grasping and conveying the sheet-shaped recording medium, for example, a pair of rollers, a combination of roller and belt, and a pair of belts.

The roller for bending the recording medium is positioned between the first conveyance means and the second conveyance means so that it is rotatable and can be moved between the position where it contacts and bends the recording medium and the predetermined position where it does not bend the recording medium. In order to move the roller between the two positions, it is possible to use any known means, for example, a cam or a crank.

The distance between the first conveyance means and the second conveyance means should preferably be as short as possible. When the distance is long, the read-out or recording start position or the read-out or recording end position of the recording medium becomes far inward from the forward end or the rear end of the recording medium, and read-out or recording on the recording medium cannot be conducted efficiently. Further, it is necessary that the recording medium be supported by the first conveyance means and the second conveyance means as long as recording or read-out is conducted by scanning the recording medium by a light beam.

The present invention is very advantageous particularly when high-precision recording or read-out is required as in the case of the aforesaid radiation image recording and reproducing system wherein a stimulable phosphor is exposed to a radiation passing through an object such as the human body to have a radiation image stored therein and is then scanned by stimulating rays which cause the stimulable phosphor to emit light in proportion to the radiation energy stored, the emitted light is detected and converted into an electric image signal, and a visible radiation image is reproduced by scanning a recording medium by a light beam on the basis of the obtained electric image signal.

DESCRIPTION OF THE PREFERRED EMBODIMENTS

The present invention will hereinbelow be described in further detail with reference to the accompanying drawings.

Figure 1:
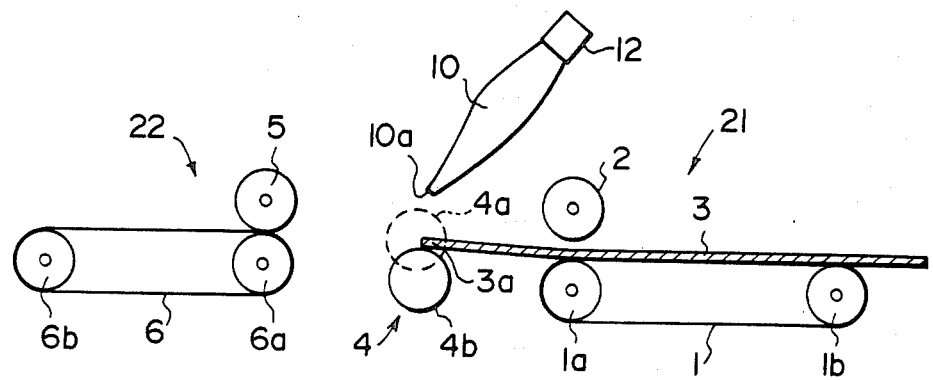
FIG. 1 is a side view showing an embodiment of the apparatus for scanning a sheet-shaped recording medium in accordance with the present invention when a recording medium is introduced into the image read-out section.
Figure 2:
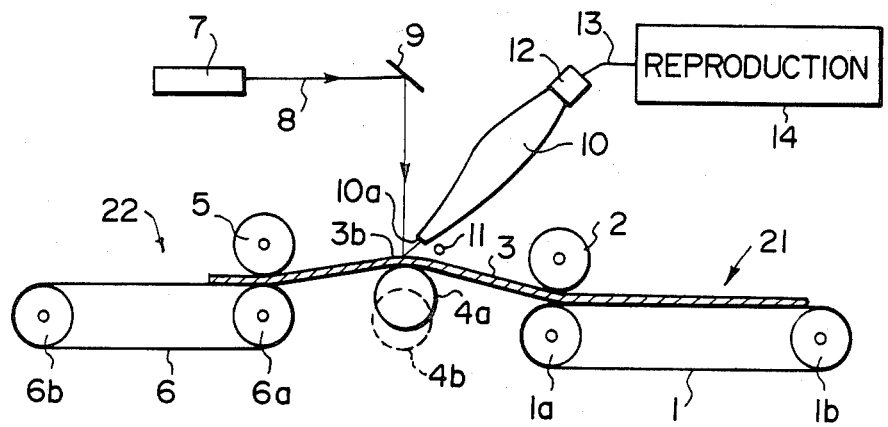
FIG. 2 is a side view showing the embodiment of FIG. 1 when an image stored in the recording medium is read out.
Figure 3:
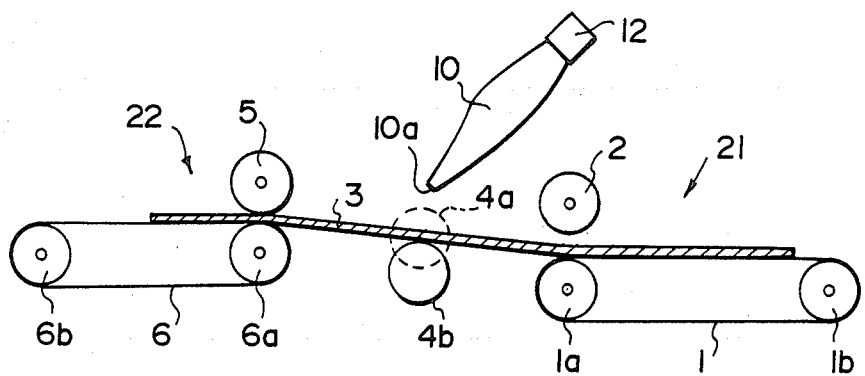
FIG. 3 is a side view showing the embodiment of FIG. 1 when the recording medium is rapidly sent without conducting image read-out.

FIGS. 1, 2 and 3 show an embodiment of the apparatus for scanning a sheet-shaped recording medium in accordance with the present invention. FIG. 1 shows the step of introducing a stimulable phosphor sheet 3 carrying a radiation image stored therein into an image read-out section. FIG. 2 shows the step of reading out the radiation image stored in the sheet 3, and FIG. 3 shows the step of rapidly sending the sheet 3 without conducting image read-out. An inlet conveyance means 21, i.e. the first conveyance means, is constituted by an inlet conveyor belt 1 rotated by a pair of belt pulleys 1a and 1b, and an inlet roller 2 positioned above the belt pulley 1a on the downstream side of the inlet conveyor belt 1. An outlet conveyance means 22, i.e. the second conveyance means, is constituted by an outlet conveyor belt 6 rotated by a pair of belt pulleys 6a and 6b, and an outlet roller 5 positioned above the belt pulley 6a to stand face to face with the outlet conveyor belt 6. In the outlet conveyance means 22, the sheet 3 is nipped by the outlet roller 5 and the outlet conveyor belt 6. The inlet conveyor belt 1 and the outlet conveyance means 22 are positioned in spaced relation to each other by a distance shorter than the length of the sheet 3 so that the sheet 3 can be transferred therebetween. A main roller 4 having a rotation shaft extending in the width direction of the sheet 3 is positioned between the inlet conveyor belt 1 and the outlet conveyance means 22.

The main roller 4 can be moved up as shown in FIG. 2 to a read-out position 4a where it contacts and bends the sheet 3 convex upwardly as viewed from the upper side of the sheet, and can be moved down as shown in FIGS. 1 and 3 to a rapid sending position 4b where the sheet 3 is aligned with the conveyance line connecting the inlet conveyor belt 1 to the outlet conveyance means 22. When the main roller 4 is at the read-out position 4a, the sheet 3 is conveyed by being grasped between the outlet conveyor belt 6 and the outlet roller 5 of the outlet conveyance means 22 while the sheet 3 is bent by the main roller 4 and is contacted with the inlet roller 2. As shown in FIG. 1, when the sheet 3 is introduced from the inlet conveyor belt 1 to the image read-out section, the main roller 4 is moved down to the rapid sending position 4b. Since the sheet 3 has rigidity, it is sent to the outlet conveyance means 22 approximately in the flat form along the conveyance line connecting the inlet conveyor belt 1 to the outlet conveyor belt 6, and is grasped between the outlet conveyor belt 6 and the outlet roller 5.

When a forward end portion 3a of the sheet 3 is grasped between the outlet conveyor belt 6 and the outlet roller 5, the main roller 4 is moved up and bends the sheet 3 as shown in FIG. 2. At this time, the end portions of the sufficiently rigid sheet 3 are supported by the inlet roller 2 and the outlet roller 5, and the center thereof is pushed up by the main roller 4 moved to the read-out position 4a. Thus the sheet 3 is securely held in the form bent convex upwardly. As a result, a bent portion 3b of the sheet 3 supported by the main roller 4 becomes free from distortion, curling or the like and becomes even and straight in the width direction of the sheet 3 at an angle normal to the drawing sheet in FIG. 2. A laser beam 8 emitted by a laser beam source 7 is made to impinge upon the straight bent portion 3b by a scanning optical system such as a galvanometer mirror 9 so that the bent portion 3b is scanned by the laser beam 8 in the main scanning direction. As the sheet 3 is exposed to the laser beam 8, it emits light in proportion to the radiation energy stored. At the same time, the sheet is moved by the outlet conveyance means 22 at a predetermined speed in the sub-scanning direction. Therefore, the whole surface is two-dimensionally scanned by the laser beam 8. The light emitted by the bent portion 3b when it is exposed to the laser beam 8 enters a light guide member 10 positioned in parallel with the bent portion 3b from a front end face 10a thereof, and is guided inside of the light guide member 10 up to a rear end face thereof. The light thus guided is converted by a photoelectric converter (photomultiplier) 12 closely contacted with the rear end face of the light guide member 10 into an electric image signal. The electric image signal is sent via a line 13 to an image reproducing apparatus 14 in which it is subjected to signal processing and used to reproduce a visible image or to display the visible image on a CRT. At the bent portion 3b of the sheet 3, distortion, curling and the like, which often arises in the sheet 3 in the free condition, are eliminated by the bending action. Therefore, by positioning the front end face 10a of the light guide member 10 close to the bent portion 3b in parallel therewith, it is possible to obtain a correct image at a high efficiency.

The movement speed of the sheet 3 in the sub-scanning direction is controlled by the outlet conveyance means 22 grasping the sheet 3, and the inlet conveyor belt 1 acts only to assist the sheet conveyance. That is, though the inlet conveyor belt 1 and the outlet conveyance means 22 ideally send the sheet 3 at the same speeds, a slight difference in the sending speed sometimes arises. Therefore, the sheet 3 is allowed to slide on the inlet conveyor belt 1 to accommodate the difference between the sending speeds of the inlet conveyor belt 1 and the outlet conveyance means 22. Accordingly, it is only necessary that the sending speed of the outlet conveyance means 22 be controlled, and the control of the sending speed is comparatively easy.

A stopper 11 is positioned below the front end face 10a of the light guide member 10. When the sheet 3 is sent and the rear end portion thereof separates from the inlet roller 2, the rear end portion of the rigid sheet springs upwardly. At this time the stopper 11 prevents the rear end portion from striking against the light guide member 10.

FIG. 3 shows the step of rapidly sending the sheet 3 without conducting image read-out. At this step, the main roller 4 is moved down to the rapid sending position 4b, and the sheet 3 is positioned on the conveyance line approximately straightly connecting the inlet conveyor belt 1 to the outlet conveyance means 22. Therefore, the sheet 3 is not forcibly bent as shown in FIG. 2 and can be sent rapidly in the approximately flat form. Further, since the space between the sheet 3 and the front end face 10a of the light guide member 10 becomes large, the sheet 3 does not contact the light guide member 10 even when the sheet 3 flutters during the rapid sending or is curled.

It should be understood that the present invention can be embodied in various types other than the above described embodiment. For example, in the aforesaid embodiment, since the comparatively rigid stimulable phosphor sheet 3 is used as the sheet-shaped recording medium, the inlet roller 2 is provided and the sheet 3 is grasped also by the inlet conveyance means 21 to bend the sheet 3. However, in the case where the recording medium is not so rigid and bends by its own weight when the main roller 4 contacts it, the inlet roller 2 is not necessary.

In the case where the recording medium is rigid to some extent, it is possible to position the main roller 4 above the sheet 3 and to position the scanning optical system below the sheet 3 so that the sheet 3 is bent downward. In this case, too, the inlet roller 2 is not necessary.

I claim:

1. An apparatus for scanning a sheet-shaped recording medium, the apparatus comprising:

(i) a first conveyance means for conveying the sheet-shaped recording medium,
(ii) a second conveyance means for receiving and conveying said recording medium conveyed by said first conveyance means, said second conveyance means being positioned downstream of said first conveyance means in spaced relation thereto by a predetermined distance shorter than the length of said recording medium,
(iii) a roller, positioned between said first conveyance means and said second conveyance means, movable in a first direction approximately normal to a recording medium conveyance plane away from said recording medium for enabling said recording medium to be conveyed by said first conveyance means toward said second conveyance means, said roller further being movable in a second direction opposite said first direction for contacting said recording medium after said recording medium conveyed by said first conveyance means reaches said second conveyance means so as to bend said recording medium convex as viewed from the side thereof opposite to said roller, and
(iv) a scanning optical system positioned on the side opposite to said roller with respect to said recording medium for scanning the convex surface of said recording medium bent by said roller by a light beam in a scanning direction normal to the conveyance direction of said recording medium.

2. An apparatus as defined in claim 1 wherein said sheet-shaped recording medium is a medium which already carries an image stored therein and releases light carrying the image therefrom when scanned by said scanning optical system.

3. An apparatus as defined in claim 2 wherein said sheet-shaped recording medium is a stimulable phosphor sheet carrying a radiation image stored therein.

4. An apparatus as defined in claim 3 wherein said light beam is a laser beam, and said scanning optical system comprises a light guide member and a photomultiplier for detecting light emitted by said stimulable phosphor sheet in proportion to the stored radiation energy when said stimulable phosphor sheet is scanned by said laser beam.

5. An apparatus as defined in claim 1 wherein said first conveyance means comprises a belt.

6. An apparatus as defined in claim 1 wherein said second conveyance means comprises a roller and a belt.

* * * * *